US012623740B2

(12) United States Patent
Gifford et al.

(10) Patent No.: US 12,623,740 B2
(45) Date of Patent: May 12, 2026

(54) SYSTEMS AND METHODS FOR OPENING AND CLOSING VEHICLE DOORS DURING MANUFACTURING

(71) Applicant: Toyota Motor Engineering & Manufacturing North America, Inc., Plano, TX (US)

(72) Inventors: Andrew DJ Gifford, Woodstock (CA); Matthew Neal Jantzi, Kitchener (CA); Graham A. Condon, Ingersoll (CA); Edwin J. Bates, Kitchener (CA); Christlin Francis, Kitchener (CA); Curtis Cochrane, Woodstock (CA); Nathan Andrew Swick, Hagersville (CA); Solomon HC Au-Yeung, Richmond Hill (CA); Ankush Patil, Kitchener (CA)

(73) Assignees: Toyota Motor Engineering & Manufacturing North America, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 140 days.

(21) Appl. No.: 18/650,334

(22) Filed: Apr. 30, 2024

(65) Prior Publication Data
US 2025/0333129 A1     Oct. 30, 2025

(51) Int. Cl.
B62D 65/06 (2006.01)
B25J 5/02 (2006.01)
(Continued)

(52) U.S. Cl.
CPC ............. B62D 65/06 (2013.01); B62D 65/18 (2013.01)

(58) Field of Classification Search
CPC ............. B62D 65/06; B62D 65/18; B25J 5/02
(Continued)

(56) References Cited

U.S. PATENT DOCUMENTS 4,342,536 A * 8/1982 Akeel ................. B05B 13/0452
                                                              414/744.5
4,556,361 A * 12/1985 Bartlett .................. B62D 65/06
                                                              414/744.8
(Continued)

FOREIGN PATENT DOCUMENTS

| CN | 114522830 A | 5/2022 |
| DE | 102021133410 A1 | 6/2023 |
| JP | 3636384 B2 | 4/2005 |

OTHER PUBLICATIONS

US 2006/0292308 A1, Clifford et al., Dec. 28 (Year: 2006).*
(Continued)

*Primary Examiner* — Douglas A Hess
(74) *Attorney, Agent, or Firm* — Christopher G. Darrow; Darrow Mustafa PC

(57) ABSTRACT

Systems, methods, and other embodiments described herein relate to the opening and closing of vehicle doors during manufacturing. In one embodiment, a vehicle door-opening system includes 1) a plate attachable to a vehicle door and 2) a pin inserted into a pin sleeve of the plate. The pin extends downward from the vehicle door. The vehicle door-opening system also includes a set of channels on lateral sides of the vehicle. The set of channels extend in a direction of travel of the vehicle along a manufacturing line. A channel receives and guides the pin as the vehicle moves along the manufacturing line. As the vehicle moves, an interaction between the pin and a curve in the channel opens and closes the vehicle door.

20 Claims, 11 Drawing Sheets

(51) Int. Cl.
　　*B62D 65/08*　　　(2006.01)
　　*B62D 65/18*　　　(2006.01)
(58) Field of Classification Search
　　USPC ....................................................... 198/468.1
　　See application file for complete search history.

(56) References Cited

U.S. PATENT DOCUMENTS

| | | | | |
|---|---|---|---|---|
| 4,636,136 | A * | 1/1987 | Nomura | B62D 65/06 |
| | | | | 901/44 |
| 4,721,630 | A | 1/1988 | Takeo et al. | |
| 4,946,336 | A * | 8/1990 | Larsson | B05C 13/02 |
| | | | | 414/737 |
| 4,988,260 | A * | 1/1991 | Kiba | B62D 65/06 |
| | | | | 414/744.1 |
| 5,192,593 | A * | 3/1993 | Matsuo | B05B 13/0292 |
| | | | | 427/427.2 |
| 5,286,160 | A * | 2/1994 | Akeel | B05B 13/0292 |
| | | | | 414/800 |
| 5,941,679 | A * | 8/1999 | Foti | B25J 15/0019 |
| | | | | 901/29 |
| 7,622,158 | B2 | 11/2009 | Clifford et al. | |
| 8,015,938 | B2 | 9/2011 | Herre et al. | |
| 8,393,292 | B2 | 3/2013 | Yoshino et al. | |
| 9,782,789 | B2 | 10/2017 | Bania et al. | |
| 9,919,330 | B2 | 3/2018 | Letard et al. | |
| 10,267,562 | B2 * | 4/2019 | Natsume | F26B 3/04 |
| 10,363,570 | B2 | 7/2019 | Natsume | |
| 11,529,644 | B2 | 12/2022 | Bania et al. | |
| 12,059,800 | B2 * | 8/2024 | Williamson | B62D 65/06 |
| 2009/0204260 | A1 | 8/2009 | Bryne et al. | |

OTHER PUBLICATIONS

US 2009/0204260 A1, Bryne et al., Aug. 13 (Year: 2009).*
US 2012/0163948 A1, Asamizu et al., Jun. 28 (Year: 2012).*
US 2015/0217318 A1, Letard et al., AUGUST 6 (Year: 2015).*

* cited by examiner

SYSTEMS AND METHODS FOR OPENING AND CLOSING VEHICLE DOORS DURING MANUFACTURING

TECHNICAL FIELD

The subject matter described herein relates, in general, to opening and closing vehicle doors and, more particularly, to opening and closing vehicle doors as the vehicle travels along a manufacturing line with a pin and channel system.

BACKGROUND

Vehicles are complex machines of multiple parts and formed by various processes. During vehicle manufacturing, vehicle frames are assembled, components (e.g., tires, doors, seats, windshields, dashboards, electronics, etc.) are added to the vehicle, and the vehicle is treated (e.g., painted) before being provided to a customer. In some cases, many of the manufacturing and assembly operations are performed by automated robots. As vehicles' complexity and technological development increase, so does the complexity of vehicle fabrication and assembly operations.

Vehicles may be fabricated using an assembly line production framework where components and operations are performed on a vehicle as it moves from workstation to workstation. For example, a vehicle may be placed on a conveyor belt that moves slowly through a manufacturing facility or a portion of a manufacturing facility, with different operations being performed on the vehicle as it travels. At different points in time, different operations (e.g., painting, welding, component installation) are performed on the vehicle until a completed vehicle "rolls off" the assembly line.

As one particular example of a manufacturing operation, the vehicle frame is coated with a base layer, a color layer, a top coat, and other thin films. In an example, protective and/or aesthetic coatings are applied on the interior surfaces of the vehicle. For example, a vehicle door's exterior and interior surfaces may be coated with these or other coatings.

SUMMARY

In one embodiment, example systems relate to a manner of improving vehicle manufacturing by simply and efficiently opening and closing vehicle doors without reliance on a robotic arm.

In one embodiment, a vehicle door-opening system for opening and closing vehicle doors as the vehicle travels along a manufacturing line is disclosed. The vehicle door-opening system includes 1) a plate attachable to a vehicle door and 2) a pin inserted into a pin sleeve of the plate. The pin extends downward from the vehicle door. The vehicle door-opening system also includes a set of channels on lateral sides of the vehicle. The set of channels extend in a direction of travel of the vehicle along a manufacturing line. A channel receives and guides the pin as the vehicle moves along the manufacturing line. As the vehicle moves an interaction between the pin and a curve in the channel opens and closes the vehicle door.

In one embodiment, a vehicle door-opening system includes 1) the plate attachable to the vehicle door and 2) the pin inserted into the pin sleeve of the plate and extending downward from the vehicle door. The vehicle door-opening system also includes the set of channels on lateral sides of the vehicle. The set of channels extend in a direction of travel of the vehicle along a manufacturing line. As described above, a channel receives and guides the pin as the vehicle moves along the manufacturing line. The channel curves laterally away from the vehicle such that as the vehicle moves along the manufacturing line, an interaction between the pin and the channel opens the vehicle door. The channel curves laterally toward the vehicle such that as the vehicle moves along the manufacturing line, an interaction between the pin and the channel closes the vehicle door.

In one embodiment, a vehicle door-opening system includes 1) the plate attachable to the vehicle door and 2) the pin inserted into the pin sleeve of the plate and extending downward from the vehicle door. The vehicle door-opening system also includes the set of channels on lateral sides of the vehicle. The set of channels extend in a direction of travel of the vehicle along a manufacturing line. As described above, a channel receives and guides the pin as the vehicle moves along the manufacturing line. Each set of channels includes 1) a first branched channel to close a rear door of the vehicle at a first longitudinal position along the manufacturing line and 2) a second branched channel to close a front door of the vehicle at a second longitudinal position along the manufacturing line. The vehicle door-opening system further includes a diverter to direct a front door pin to the second branched channel and a rear door pin to the first branched channel.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1:
FIG. 1 illustrates a top view of a vehicle door-opening system opening and closing vehicle doors.
Figure 1:
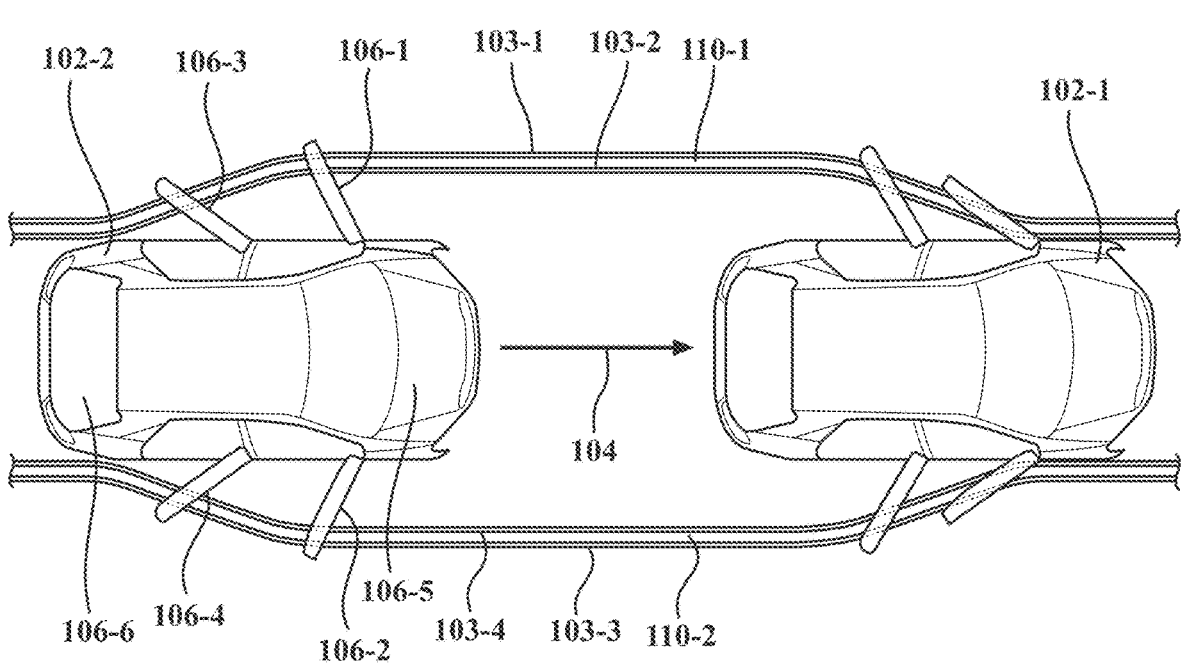

Systems, methods, and other embodiments associated with improving the manufacturing efficiency of vehicles are disclosed herein. As previously described, numerous operations are performed during the manufacturing and assembly of a vehicle. In some examples, an operation is preceded by opening a vehicle door. For example, interior portions of a vehicle and vehicle doors may be coated with a primer and topcoat. Accordingly, vehicle doors are first opened to provide a paint robot with access to the interior portions of the vehicle. During use, vehicles include door checks, which hold a door open after an individual has manually opened the door. Finished vehicles also include latches that hold a vehicle door shut. However, during the painting stage, door checks and latches may not have been installed on the vehicle. As such, a temporary door check, or "check arm," may be attached to a vehicle door to hold the vehicle door open and closed during manufacturing. In this example, a robotic arm opens the vehicle door, and the check arm holds the door open while a robot applies paint. The robotic arm then closes the door, and the check arm holds the door closed.

While the check and robotic arms facilitate the painting of the interior of the vehicle, the use of such may present certain complications to the painting and other manufacturing processes that are performed. For example, the check arm may be coated with the base layer, top coat, or other thin film as overspray during vehicle painting. The coating may then be passively or actively dried (for example, via heating as the vehicle passes through an oven). As the check arm mechanically operates (i.e., transitions from a position to hold a door open to a position to hold a door close), flakes of the dried paint or thin film may dislodge from the check arm. As another example, paint robots may generate airflow while depositing paint or other thin film coating on the vehicle surface. This airflow may also dislodge dried paint flakes. It may be that the check arm is mounted on a surface of the vehicle door above a surface that is to be painted. As such, these dislodged paint flakes may land on the surface of the vehicle that is to be painted during the painting process. Still further, in the example described above, relics of the movement of the vehicle door by the robotic arm may result in imperfections (i.e., touch marks) on the coated surface.

As such, the present specification describes a vehicle door-opening system that reduces the likelihood of surface imperfections that may result from paint flakes landing on and sticking to a painted surface and/or manipulation of a vehicle door by a robotic arm.

Robotic arms may also introduce complexity to any manufacturing operation, as programming a robotic arm is complex. The complexity of robotic programming and the nature of robotic devices make robotic devices susceptible to malfunction and/or failure. Accordingly, by opening and closing vehicle doors using non-robotic modalities, the present vehicle door-opening system may reduce the downtime that may result from a malfunctioning or non-functioning robotic device.

Specifically, the present specification describes a channel-based door opening system that is used on a manufacturing floor when painting a vehicle or performing other vehicle manufacturing operations. In one particular example, this channel-based vehicle door-opening system opens vehicle doors to facilitate painting the interior surface of a vehicle as the vehicle travels along a conveyor system. The door opening system includes a plate affixed to the vehicle door and a pin inserted into a pin sleeve of the plate and extending below the vehicle door. The pin travels through a channel/guide on the floor of the facility, which channels/guides generally run parallel to the vehicle as it moves along the manufacturing line. As used in the present specification and the appended claims, the channel refers to the space between two rails that receive the pin that is affixed to a vehicle door.

The interaction between the pin on the vehicle door and the channel system on the floor opens and closes the vehicle door during painting. For example, the channels may include a portion that curves laterally away from the vehicle. The vehicle door opens as the pin travels through this portion of the channel. While open, certain manufacturing operations may be carried out. For example, a paint robot can apply paint to the interior of the vehicle. At a later point in time, for example, after painting the interior of the vehicle, a portion of the channel may curve laterally towards the vehicle. The vehicle door is closed as the pin travels through this portion of the channel.

As described in greater detail below, in some examples, the sets of channels on either lateral side of the vehicle may include multiple paths. Pins associated with front and rear doors may pass down different paths, such that the front and rear doors are opened and closed at different longitudinal positions along the direction of travel of the vehicle.

In this way, the disclosed systems, methods, and other embodiments improve vehicle manufacturing by opening and closing vehicle doors without interaction with a robotic arm, thus preventing certain surface imperfections that may result from the interaction of a robotic arm with the vehicle. Moreover, in some examples, the plate/pin may be installed in a region of the vehicle that is below a painted surface such that any dried paint flakes that are generated and dislodged from the plate and/or pin do not land on the surface to be painted or already painted surfaces of the vehicle. The formation of such flakes is also reduced as there are few moving parts in the pin/channel-based system. While specific reference is made to the opening and closing doors during a painting operation, it should be appreciated that the systems and methods described herein may be utilized at different workstations where different operations are performed. That is, the present vehicle door-opening system may be used at any manufacturing step where doors of vehicles are opened or performed to complete a particular manufacturing operation.

It will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements.

FIG. 1 illustrates one embodiment of a vehicle door-opening system 100 opening and closing vehicle doors 106-1, 106-2, 106-3, and 106-4 (collectively referred to as 106). As described above, vehicles 102-1 and 102-2 may move along a manufacturing line, for example, on a conveyor system installed on a manufacturing floor. As a frame of reference, the vehicles 102-1 and 102-2 may move in a direction of travel 104 along the manufacturing line. The vehicles 102-1 and 102-2 may each have a number of vehicle doors 106. Different vehicles 102-1 and 102-2 may have different numbers of vehicle doors 106. In the example depicted in FIG. 1, each vehicle 102-1 and 102-2 has four vehicle doors 106, two front vehicle doors 106-1 and 106-2, and two rear vehicle doors 106-3 and 106-4. Moreover, each vehicle 102-1 and 102-2 may have a hood 106-5 and a rear hatch 106-6. For simplicity, in FIG. 1, just the vehicle doors 106-1, 106-2, 106-3, and 106-4, hood 106-5, and rear hatch 106-6 of a second vehicle 102-2 are indicated with reference numbers.

As described above, opening the vehicle doors 106 may be desirable at any point along a manufacturing line. For example, it may be desirable to open vehicle doors 106 while installing cabin components such as seats, a dashboard, and an instrument panel. As another example, it may be desirable to apply coatings such as a primer, base layer, or top coat to the interior portions of a vehicle, such as vehicle door interior panels. In either example, the vehicle door-opening system 100 of the present specification provides a simple mechanism to open the vehicle doors 106 without relying on robotic arms and complex mechanical components that may negatively impact the final product.

Figure 3:
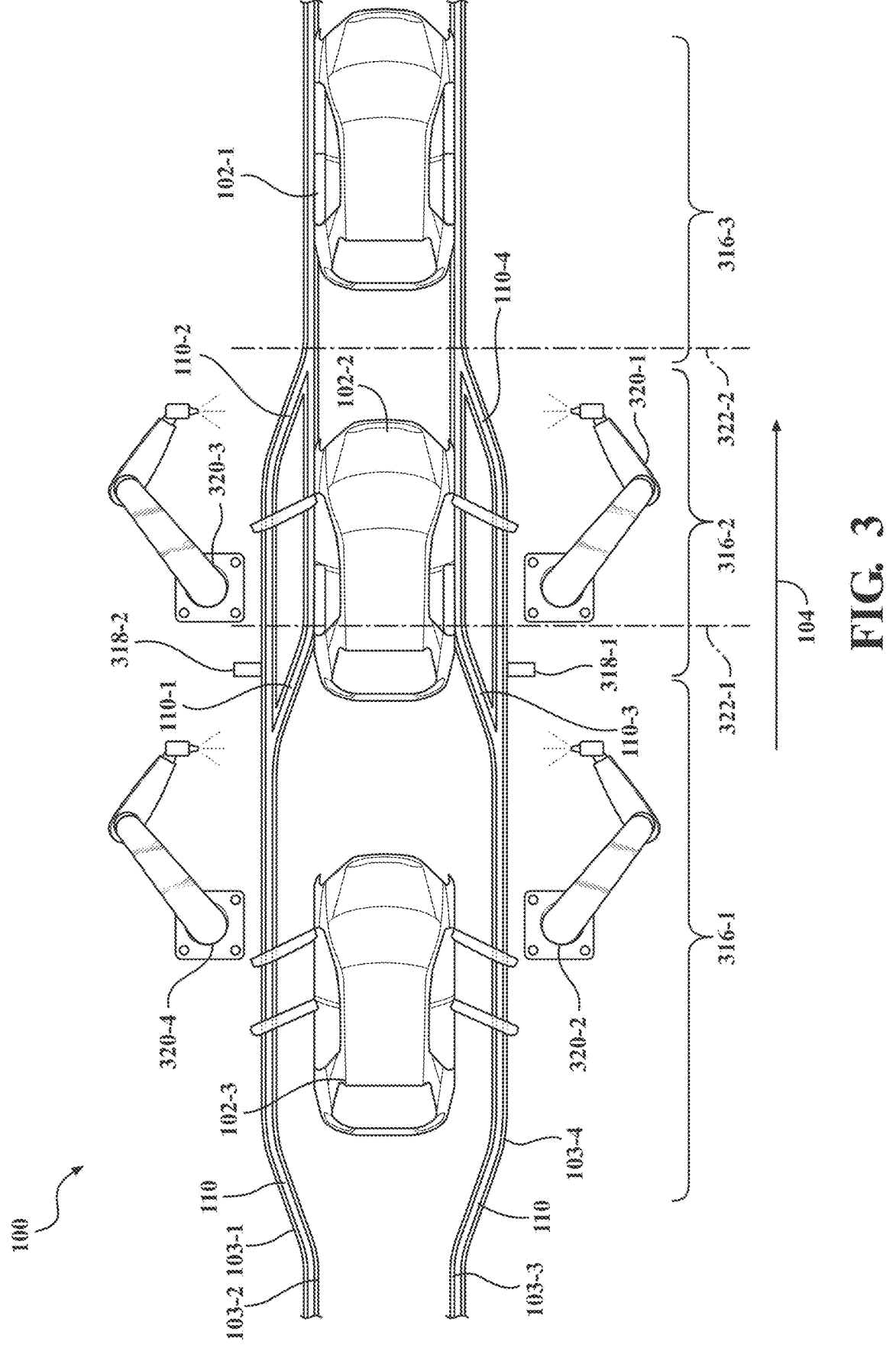
FIG. 3 illustrates a top view of a vehicle door-opening system opening and closing vehicle doors.

Specifically, the vehicle door-opening system 100 includes a set of channels 110-1 and 110-2 on either lateral side of the vehicles 102-1 and 102-2. As depicted in FIG. 1, in one example there may be a single channel 110-1 and 110-2 on either lateral side of the vehicles 102-1 and 102-2. In this example, the vehicle doors 106 are opened and closed at the same longitudinal positions along the manufacturing line. In another example, as depicted in FIG. 3, multiple channels may be on either lateral side of the vehicles 102-1 and 102-2. In this example, the front vehicle doors 106-1 and 106-3 are opened and/or closed at different longitudinal positions along the manufacturing line as compared to the rear vehicle doors 106-2 and 106-4.

The channels 110-1 and 110-2 are defined by rails 103-1, 103-2, 103-3, and 103-4 mounted to the manufacturing facility floor, either integrated or raised above the floor. That is, the channels 110-1 and 110-2 refer to the space between the rails 103-1, 103-2, 103-3, and 103-4 through which the pins travel. The rails 103-1, 103-2, 103-3, and 103-4 that define the channels 110-1 and 110-2 may take various forms. For example, as depicted in FIGS. 2, 6A, 6B, and 8A-8C, the rails 103-1, 103-2, 103-3, and 103-4 may have a "T" cross-sectional form to reduce the friction between the rails 103-1, 103-2, 103-3, and 103-4 and the pins.

Figure 2:
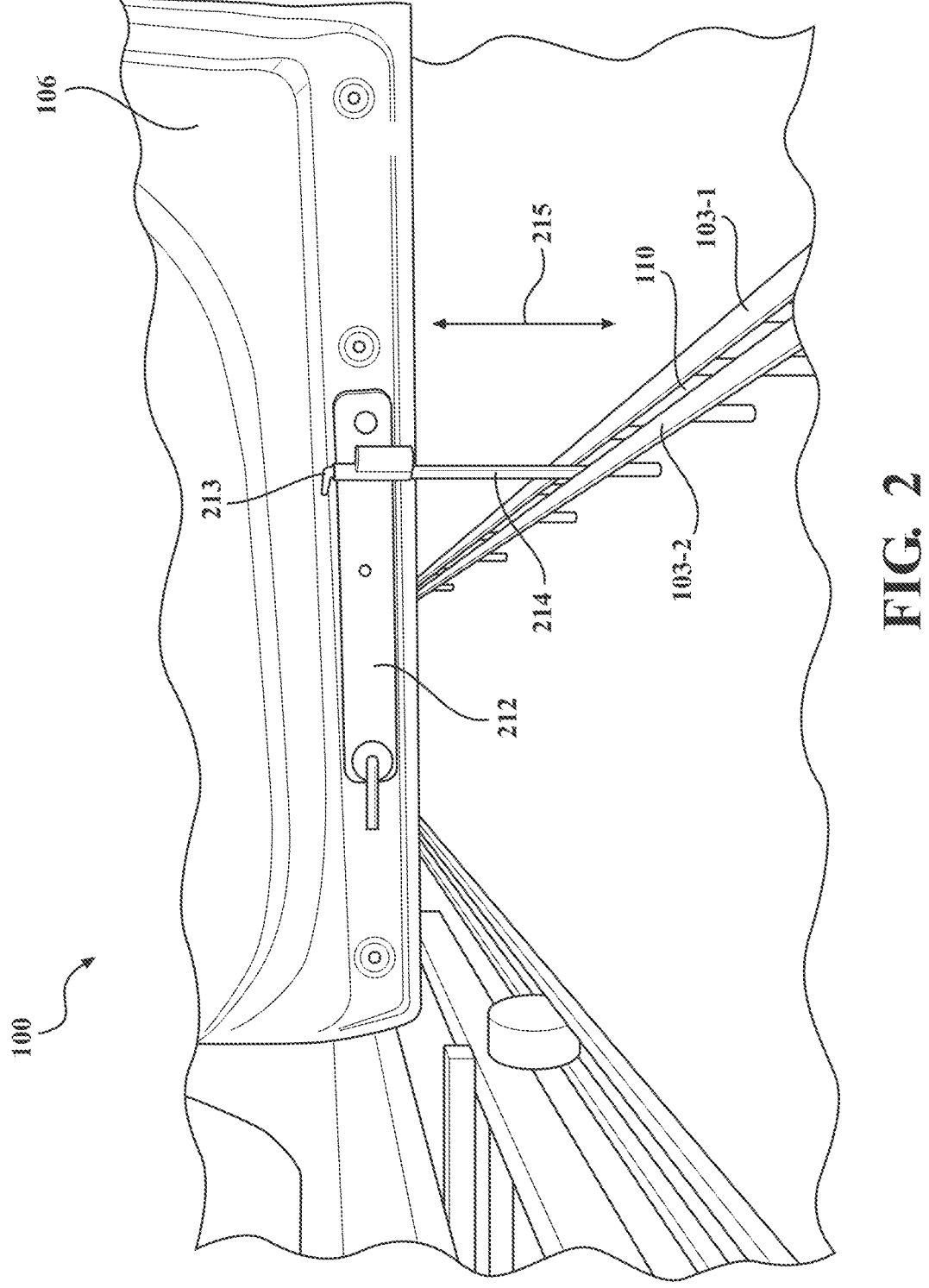
FIG. 2 illustrates one embodiment of the plate, pin, and channels of the vehicle door-opening system for opening and closing vehicle doors.

In either example, the channels 110-1 and 110-2 extend in the direction of travel 104 of the vehicles 102-1 and 102-2 as the vehicles 102-1 and 102-2 move along the manufacturing line. The channels 110-1 and 110-2 receive and guide pins affixed to the vehicle doors 106. That is, pins affixed to the vehicle doors 106 sit in vertical sleeves in the channels 110-1 and 110-2, as depicted in FIG. 2. As the vehicles 102-1 and 102-2 move, the interaction of the pin in the channels 110-1 and 110-2 opens and closes the vehicle doors 106. For example, as depicted in FIG. 1, the channels 110-1 and 110-2 curve laterally away from the vehicles 102-1 and 102-2 such that as a vehicle (e.g., the second vehicle 102-2 in FIG. 1) moves in the direction of travel 104, an interaction between the pin and the channels 110-1 and 110-2 opens the vehicle doors 106. Once opened, operations on the interior of the vehicle (e.g., painting the interior vehicle frame and vehicle door components) may be executed.

At another point in time, the channels 110-1 and 110-2 curve laterally toward the vehicles 102-1 and 102-2 such that as a vehicle (e.g., the first vehicle 102-1 in FIG. 1) moves in the direction of travel 104, an interaction between the pin and the channels 110-1 and 110-2 closes the vehicle doors. As such, the channels 110-1 and 110-2 may be spaced apart from the vehicles 102-1 and 102-2 by a distance to accommodate fully opening or closing the vehicle doors 106. For example, at regions of the manufacturing line when the vehicle doors 106, or a subset of the vehicle doors 106, are to be fully closed, the channels 110-1 and 110-2 may line up with a lateral edge of the vehicles 102-1 and 102-2. At regions of the manufacturing line when the vehicle doors 106, or a subset of the vehicle doors 106, are to be opened, the channels 110-1 and 110-2 may be laterally spaced away from the vehicles 102-1 and 102-2 by a distance that allows the vehicle doors 106 to fully open (e.g., 90 degrees relative to the associated vehicle 102) or open at some predetermined angle relative to the vehicles 102 (e.g., 45 degrees). In an example, the channels 110-1 and 110-2 do not extend the entire route of the vehicles 102-1 and 102-2 through the manufacturing facility. That is, at some point, the pins may be removed from the vehicle doors 106 or unused as the vehicles 102-1 and 102-2 travel through the manufacturing facility, for example, during transportation between different conveyor systems. In this example, another mechanism, such as magnets installed on the vehicle frame and the vehicle doors 106, may be used to keep vehicle doors 106 closed.

As such, the present vehicle door-opening system 100 provides a non-robotic modality for opening and closing vehicle doors 106, thus reducing any defect or imperfection that may result from contact between the vehicle door 106 and the robotic arm to open the vehicle doors 106. Moreover, as the pin is attached to the bottom of the vehicle door 106 and below a painted, or to-be-painted, region of the vehicle 102, there is less likelihood of overspray paint flaking off the pin onto an already or to-be-painted surface of the vehicle 102. Even if overspray does land on the pin, the pin portion of the vehicle door-opening system 100 has few moving parts, and the paint is thus less likely to flake off during operation.

FIG. 2 illustrates one embodiment of the plate 212, pin 214, and a channel 110 of the vehicle door-opening system 100 for opening and closing a vehicle door 106. In general, the plate 212 is a rigid longitudinal substrate that is removably attached to the vehicle door 106 and couples the movement imparted by the pin 214/channel 110 interaction to the vehicle door 106. The plate 212 is removably attachable to the vehicle door 106. That is, the plate 212 may be attached to the vehicle door 106 during any number of manufacturing and assembly operations and removed for other manufacturing and assembly operations, transportation between different manufacturing lines, and/or after the vehicle 102 is complete. In general, the plate 212 includes a rigid substrate with different components extending therefrom that facilitate the attachment of 1) the plate 212 to the vehicle door 106 and 2) the pin 214 to the plate 212. As depicted in FIG. 2, the plate 212 is attached to a portion of the vehicle door 106 below a region of the vehicle door 106 that is to receive paint. As such, there is a reduced risk of overspray and/or flaked paint adhering to other painted portions, or to be painted portions, of the vehicle 102. Additional details regarding the plate 212 and the attachment of such to the vehicle door 106 are provided below in connection with FIGS. 4A-4B and FIGS. 5A-5C, respectively.

Figures 4A, 4B:
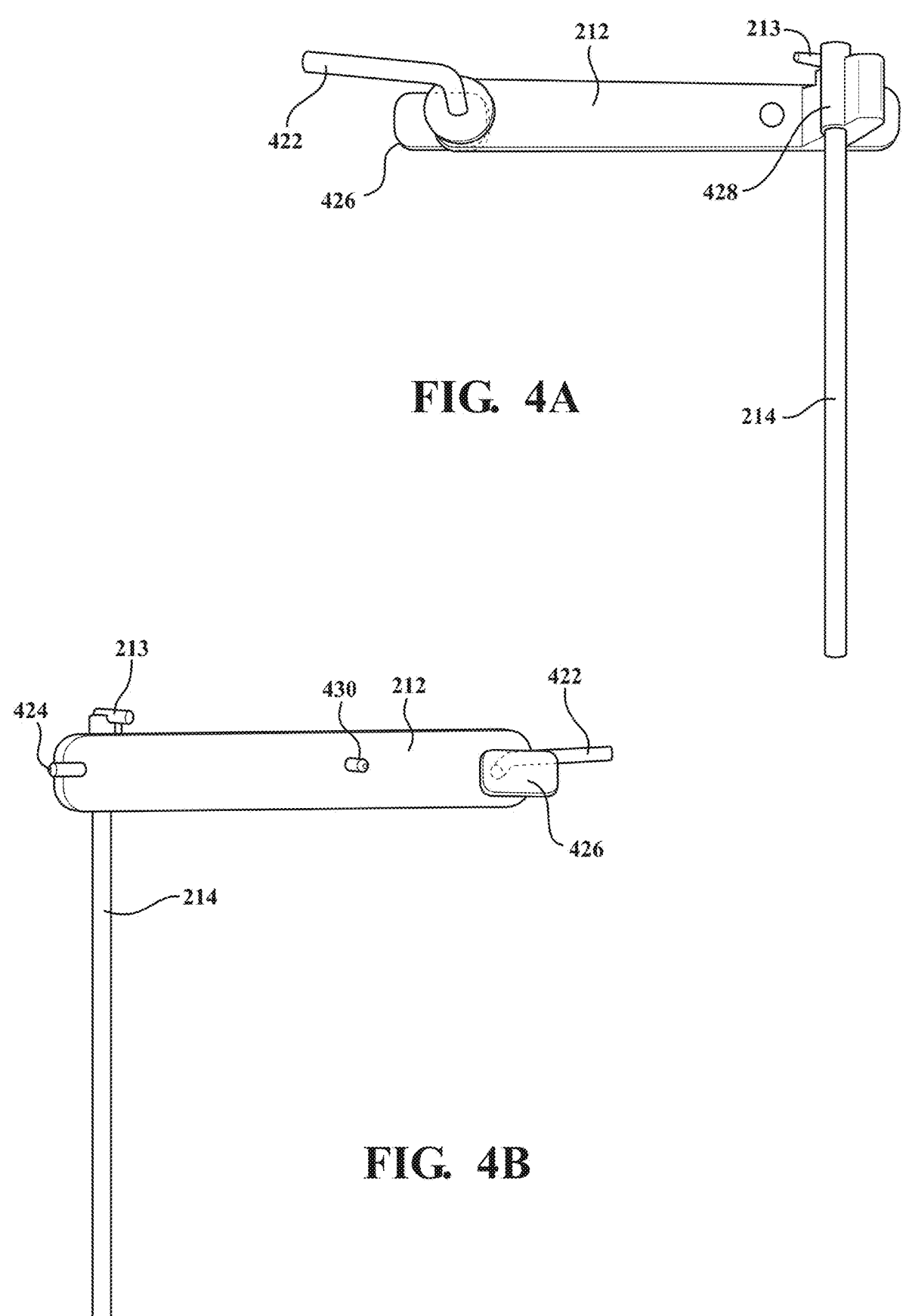
FIGS. 4A and 4B illustrate the plate and pin of the vehicle door-opening system for opening and closing vehicle doors.

In any case, the vehicle door-opening system 100 also includes a pin 214 that is inserted into a pin sleeve of the plate 212. The translational motion of the pin 214 relative to the plate 212 in a horizontal direction may be prevented via the pin sleeve. The pin 214 includes a locking rod 213 that sits in a recess in the pin sleeve to prevent the rotation of the pin 214 relative to the plate 212. Accordingly, during assembly, the pin 214 is rotated until the locking rod 213 sits in the recess, as depicted in FIG. 4B.

The pin 214 extends vertically downward from the vehicle door 106 and is received into a channel 110 on the lateral side of the vehicle 102 as the vehicle 102 travels along the manufacturing line. As described above, the channel 110 is defined by rails 103-1 and 103-2 on either side, which rails 103-1 and 103-2 may have a "T" cross-sectional form or any other form. The physical interaction between the pin 214 and the channel 110 opens and closes vehicle doors 106. For example, as the channel 110 curves away from the vehicle, the pin 214 slides within the channel 110 and opens the vehicle door 106 to which the pin 214 is attached. The distance between the channel 110 and the vehicle 102 may be determined based on various criteria such as the type of vehicle 102, the swing path of the vehicle door 106, and/or the desired angular position of the vehicle door 106 relative to the vehicle body.

In an example, the channel 110 may be wider than the pin 214 by a predetermined amount. For example, pin 214 may have a diameter of between ¼ and ½ inches, for example, ⅜ inches, and channel 110 may have a width of between ½ and 1 inch, for example, ¾ inches. Thus, the pin 214 may freely slide within the channel 110 without binding or becoming stuck. A stuck pin 214 could damage the vehicle door 106, the vehicle 102 itself, and/or other manufacturing components along the manufacturing line.

In an example, the pin 214 may slide vertically (e.g., in the direction of the arrow 215) within the channel 110. That is, a portion of the vehicle door 106 to which the pin 214 is attached may change vertical position (e.g., rise or fall) as the vehicle door 106 is opened/shut. For example, the outside edge of a rear vehicle door 106-2 and 106-4 of a vehicle 102 may rise 50 millimeters (mm) upon opening. Were the pin 214 not able to slide vertically within the channel 110, the rising of the rear vehicle door 106 may cause the pin 214 to bind within the channel 110, may impart stresses on the hinges of the vehicle door 106, or may otherwise interfere with the smooth interaction between pin 214 and the channel 110. To accommodate the rising and falling, the pin 214 may slide vertically within the channel 110. The pin 214 may have a certain length to ensure the pin 214 remains in the channel 110, notwithstanding any vertical movement of the vehicle door 106 and/or pin 214. For example, the pin 214 may extend below the channel 110 by a certain amount (e.g., 100 mm) to ensure that the pin 214 remains within the channel 110, even as it slides vertically within the channel 110 as a result of door elevation change during opening and/or closing. The length of the pin 214 and the amount the pin 214 extending below the channel 110 may be selected based on several factors, including the type of vehicle 102 and the vertical displacement of portions of the vehicle door 106 upon opening/closing. Note that while FIG. 2 depicts a particular size/shape of certain components (e.g., the plate 212, pin 214, channel 110, and rails 103-1 and 103-2), similar components with different sizes/shapes may be implemented. For example, circular cross-sectional rails 103-1 and 103-2 and/or a pin 214 with different dimensions may be implemented in accordance with the principles described herein.

FIG. 3 illustrates one embodiment of a vehicle door-opening system 100 opening and closing vehicle doors 106. In the example depicted in FIG. 3, the manufacturing operation is a painting operation in a paint booth. In this example, the paint booth may house multiple paint robots 320-1, 320-2, 320-3, and 320-4 that apply paint (e.g., primer, base layer, top coat, etc.) to the vehicle frame. As described above, painting interior portions of the vehicle frame may be desirable. As such, the vehicle door-opening system 100 described herein facilitates the opening of the vehicle doors 106 to provide access to the interior portions of the vehicle 102.

FIG. 3 depicts an example of the vehicle door-opening system 100 that opens and closes the vehicle doors 106 at different longitudinal positions along the direction of travel 104 of the vehicle 102 along the manufacturing line. For example, it may be the case that some manufacturing operations are to be performed with front (or rear) vehicle doors closed and rear (or front) vehicle doors opened. As a specific example, it may be desirable to paint a forward-facing portion of a rear vehicle door, such as a forward-facing front pillar of the rear vehicle door. In this example, painting this surface may be most efficient when the rear vehicle door is shut and the front vehicle door is opened, as is the case when the vehicle 102 is in a second region 316-2 of the paint booth. That is, it may be desirable for the rear vehicle door to be closed to expose the surface to be painted and for the front vehicle door to be open to allow the paint robot 320 to reach the exposed front-facing surface of the rear vehicle door. While one particular example is provided of a scenario that would trigger opening and closing different vehicle doors 106 at different longitudinal positions along the manufacturing line, other such scenarios may dictate an arrangement as depicted in FIG. 3, where front vehicle doors and rear vehicle doors are opened at different longitudinal manufacturing line positions.

In this example, the vehicle door-opening system 100 includes channels 110 defined by rails 103 on either lateral side of the vehicles 102-1, 102-2, and 102-3 (collectively 102) that facilitate closing the doors at different longitudinal positions of the manufacturing line. Specifically, the set of channels 110 on a particular lateral side of the vehicles 102 may include a first branched channel 110-1 and 110-3 to close the rear doors of the vehicles 102 at a first longitudinal position 322-1 along the manufacturing line and a second branched channel 110-2 and 110-4 to close the front doors of the vehicles 102 at a second longitudinal position 322-2 along the manufacturing line. For example, on the driver side of the vehicles 102, a set of channels may include a first branched channel 110-1 and a second branched channel 110-2, and the passenger side of the vehicles 102 may also include a first branched channel 110-3 and a second branched channel 110-4.

As depicted in FIG. 1, the front and rear doors, while opened and closed at different times, are opened and closed at the same longitudinal position of the manufacturing line. In the example depicted in FIG. 3, the front doors are closed at a different longitudinal position (i.e., a second longitudinal position 322-2) compared to the longitudinal position where the rear doors are closed (i.e., the first longitudinal position 322-1) and at a different time. As such, before a vehicle, such as the third vehicle 102-3, reaches the branched channels and is in a first region 316-1, both front and rear vehicle doors 106 are opened. As a vehicle, such as the second vehicle 102-2, passes the junction of the branched channels and is in a second region 316-2, the front doors remain open while the rear doors are closed. As a vehicle, such as the first vehicle 102-1, passes the second longitudinal position 322-2 and is in a third region 316-3 of the paint booth or other workstation, the front and rear doors are closed.

Accordingly, in this example, the vehicle door-opening system 100 includes a diverter to, when in a first position, guide front door pins to the second branched channels 110-2 and 110-4, wherein the front doors are maintained open along the second branched channels 110-2 and 110-4 at the first longitudinal position 322-1 of the manufacturing line. The diverter, when in a second position, guides rear door pins to the first branched channels 110-1 and 110-3, wherein the rear doors are closed along the first branched channels 110-1 and 110-3 at the first longitudinal position 322-1 of the manufacturing line. That is, the diverter is a switch to direct pins affixed to different doors (i.e., front doors and rear doors) along different paths (i.e., branched channels), which re-direction facilitates the opening and closing of the different doors (e.g., rear and front doors) at different longitudinal positions along the manufacturing line. Additional details regarding the form and operation of the diverter are provided below in connection with FIGS. 6A-6C. As described there, the diverter may be an electromechanical or mechanical device that pivots about a point or otherwise selectively blocks one branched channel while establishing a continuous path through another.

In an example, the vehicle door-opening system 100 includes a control system to control when the diverter moves between the first position and second position to direct the front and rear doors to the second branched channels 110-2 and 110-4 and the first branched channels 110-1 and 110-3, respectively. The switching of the diverter from a first position where a pin is directed to a second branched channel 110-2 and 110-4 to a second position where a pin is directed to a first branched channel 110-1 and 110-3 is based on the position of the pin affixed to the front vehicle door 106, which is reflective of the position of the position of a vehicle 102 along the manufacturing line. That is, before the front door pin reaches the junction of the branched channels, the diverter is positioned to direct the front door pin towards the second branched channels 110-2 and 110-4, which second branched channel 110-2 and 110-4 is laterally farther away from the vehicle such that the front doors are maintained open. After the front door pin passes this junction, the control system moves the diverter to the second position. In this second position, the diverter directs the rear door pin towards the first branched channels 110-1 and 110-3. The first branched channels 110-1 and 110-3 are laterally closer to the vehicle 102 and are positioned such that the rear doors are closed.

In other words, the control system monitors the entry of the front door pin to the second branched channel 110-2 and 110-4 and triggers the movement of the diverter from the first position to the second position responsive to the front door pin entering the second branched channel 110-2 and 110-4. As such, some of the doors are held open by virtue of their door pins being in the laterally farther channels (e.g., the second branched channels 110-2 and 110-4), while other doors are closed by virtue of their door pins being in the laterally closer channels (e.g., the first branched channels 110-1 and 110-3).

As such, the vehicle door-opening system 100 includes monitoring devices 318-1 and 318-2, which may detect when the front door pins have entered the second branched channels 110-2 and 110-4. Such monitoring devices 318-1 and 318-2 may take various forms. For example, the monitoring devices 318-1 and 318-2 may be cameras that capture images with captured images transmitted to the control system. The controller may include an image processor to analyze the images and detect objects therein. When a front door pin is detected in an image, the control system may trigger the actuation of the diverter. In another example, the monitoring devices 318-1 and 318-2 may be photo eyes, which have a light emitter and a receiver in separate housings on either side of a channel 110 through which a pin 214 passes. A sensed object, i.e., a pin 214, interrupts the light beam from being detected at the receiver, which interruption may trigger the actuation of the diverter. In another example, the photo eye may be a reflective photo eye with the emitter and receiver in the same housing on the same side of a channel 110. In this example, the passage of the pin 214 causes emitted light to be reflected to the receiver. The reflection of light toward the receiver may trigger the actuation of the diverter. While particular reference is made to a particular type of monitoring device 318-1 and 318-2 described herein, a variety of other types of monitoring devices 318-1 and 318-2 may be implemented in accordance with the principles described herein. Additional details regarding the operation of the control system are provided in connection with FIGS. 6A-6C.

In some examples, detecting the front door pin entering the second branched channels 110-2 and 110-4 may also trigger other actions. For example, the robots (e.g., the paint robots 320-1, 320-2, 320-3, and 320-4) may be programmed to perform certain movements/actions based on the movement of the vehicles 102-1, 102-2, and 102-3 along the conveyor system. The output of the monitoring devices 318-1 and 318-2 may authorize or check whether the robots can/should perform their programmed operations. For example, a front door pin not being detected as having entered the second branched channels 110-2 and 110-4 may indicate some malfunction of the system (e.g., the front doors are not opened), such that the robot should not perform its intended operation as such may result in a collision/damage to the front door and/or robot as the robot's intended operation may presume the door is open. As such, based on the output of the monitoring devices 318-1 and 318-2, other manufacturing facility systems (robots, conveyors, etc.) may be authorized to perform their intended function or prevented from doing so.

In a specific example, the monitoring devices 318-1 and 318-2 may trigger the actuation of the manufacturing robots used in the workstation. For example, paint robots 320-1, 320-2, 320-3, and 320-4 may be programmed to follow a path according to a predetermined schedule to paint the interior of a vehicle. However, the path and schedule may presume that a vehicle is in a predetermined position with a predetermined configuration (e.g., the front doors are open while the rear doors are shut). Damage to the vehicle and/or the paint robots 320 may occur if these conditions are not satisfied. Accordingly, the output of the monitoring devices 318-1 and 318-2 may authorize/permit the execution of the manufacturing robots (e.g., paint robots 320-1, 320-2, 320-3, and 320-4) intended operation responsive to the rear door pins entering the first branched channels 110-1 and 110-3. That is, the rear door pins entering the first branched channels 110-1 and 110-3 may authorize the painting robots to continue along their predetermined painting routine. As such, the present vehicle door-opening system 100 facilitates the independent opening and closing of doors at different positions along the manufacturing route.

FIGS. 4A and 4B illustrate the plate 212 and pin 214 of the vehicle door-opening system 100 for opening and closing vehicle doors 106. Specifically, FIG. 4A illustrates a front side, or side facing away from the vehicle door 106, of the plate 212 and pin 214 and FIG. 4B illustrates a back side, or side facing the vehicle door 106, of the plate 212 and pin 214. As depicted, the pin 214 is inserted into a pin sleeve 428. The pin sleeve 428 prevents the translational movement of the pin 214 relative to the plate 212. The pin 214 includes a locking rod 213 that sits in a recess in the pin sleeve 428 to prevent the rotation of the pin 214 within the pin sleeve 428 relative to the plate 212. Accordingly, during assembly, the pin 214 is rotated until the locking rod 213 sits in the recess, as depicted in FIG. 4B.

As described above, the plate 212 may be removably attached to the vehicle door 106. That is, the plate 212 may be attached to and removed from the vehicle door 106 as needed during the manufacturing process. Accordingly, the plate 212 may include certain structural components that aid in attaching the plate 212 and pin 214 to the vehicle door 106. Specifically, the plate 212 may include a locating hook 424 inserted into an opening in the vehicle door 106 interior frame. The hole into which the locating hook 424 is inserted may be similar in size to the diameter of the locating hook 424. During insertion, the plate 212 is positioned perpendicularly to the vehicle door 106 with the end of the locating hook 424 set in the opening. An installer may then rotate the plate 212 such that the plate 212 is parallel to and positioned against the interior vehicle door 106 interior skin with the locating hook 424 fully inserted in the opening.

Figure 5A:
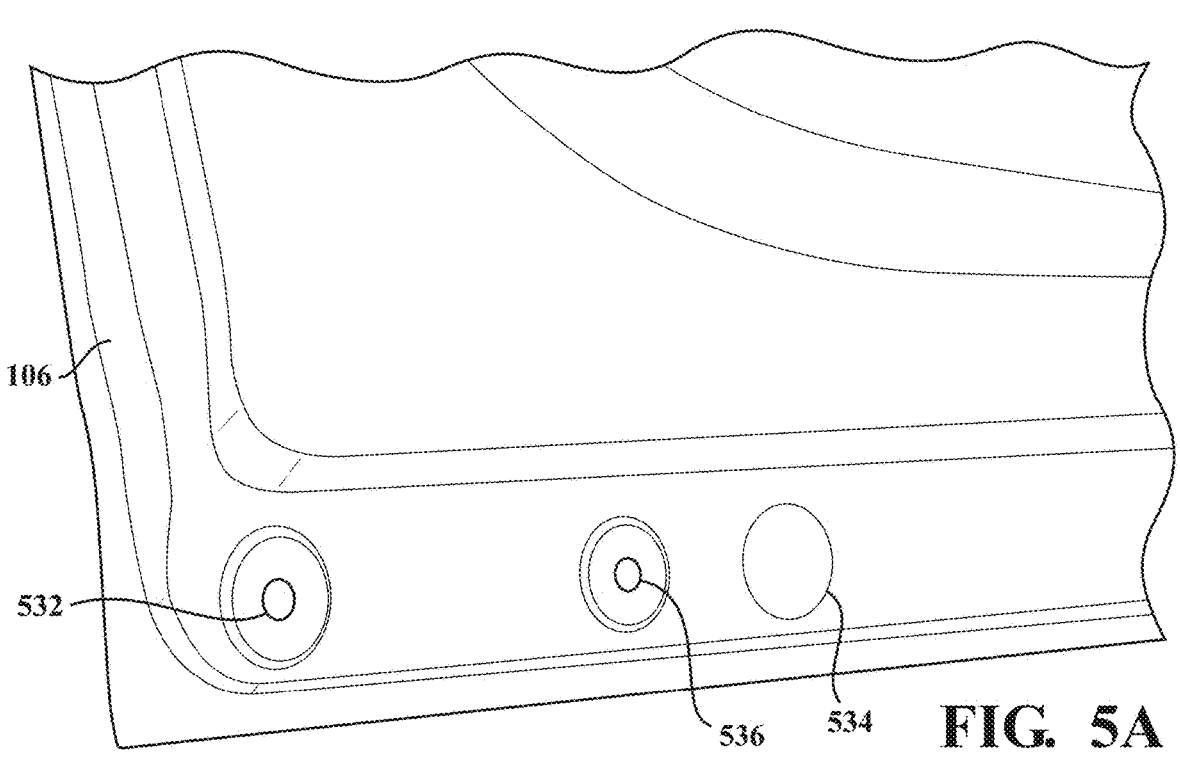
FIGS. 5A-5C illustrate the plate and pin of the vehicle door-opening system for opening and closing vehicle doors installed on a vehicle door.
Figure 5B:
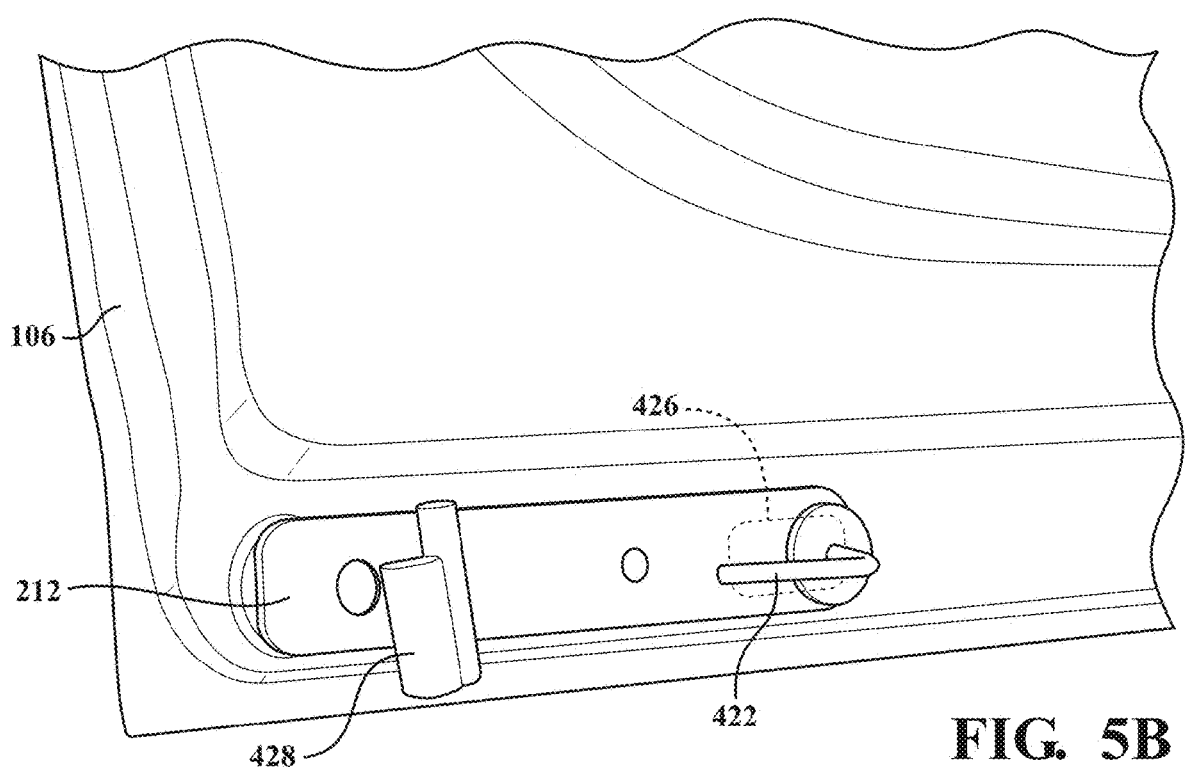

The plate 212 may include a handle 422 with a locking lobe 426. When in an unlocked position, as depicted in FIG. 5B, the locking lobe 426 passes through another opening in the vehicle door 106 interior skin. Upon insertion, the handle 422 is rotated to a locked position, as depicted in FIGS. 4A and 4B. In the locked position, the locking lobe 426 moves into a position on the interior of the vehicle door 106 panel. That is, the vehicle door 106 panel is sandwiched between the locking lobe 426 and the plate 212. FIGS. 5A and 5B below depict the attachment of the plate 212 to a vehicle door 106.

The plate 212 may also include a locating protrusion 430, which helps to align the plate 212 with the vehicle door 106. This locating protrusion 430 may align with a corresponding vehicle door 106 interior panel opening.

Figure 5C:
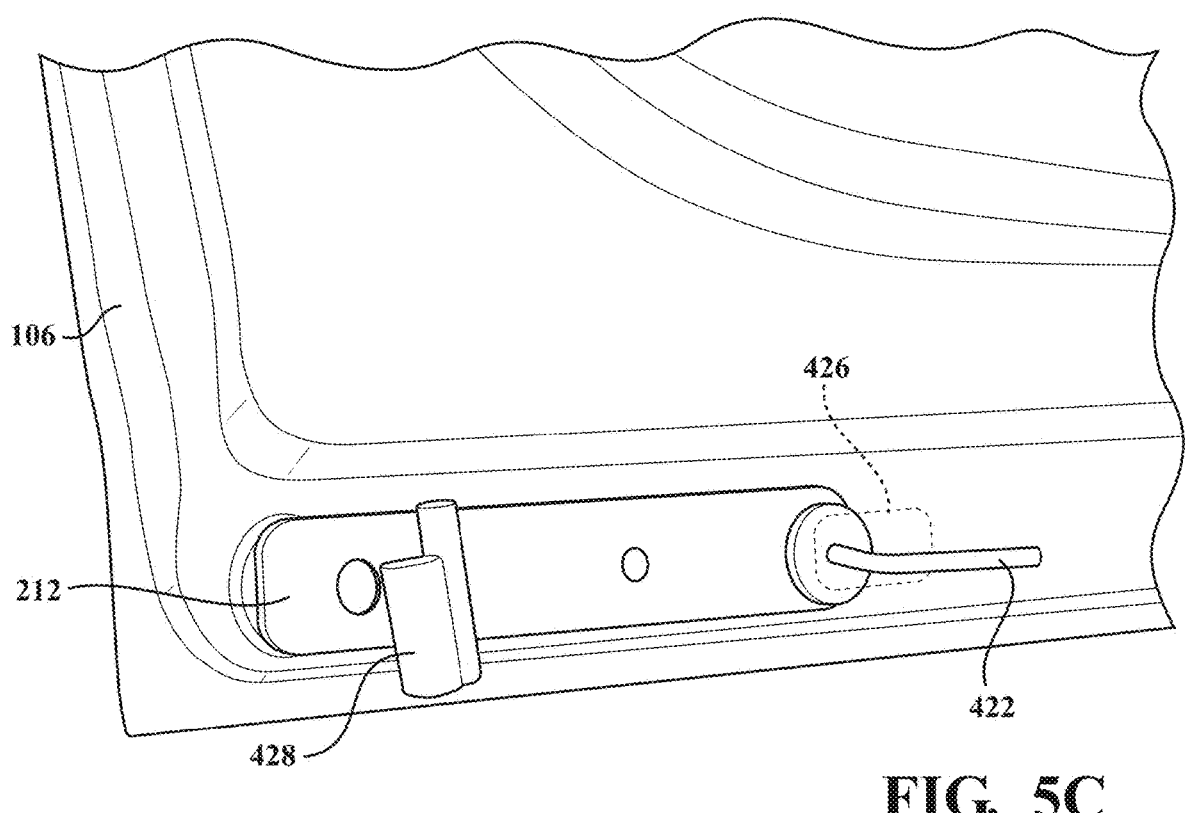

FIGS. 5A-5C illustrate the plate 212 and pin 214 of the vehicle door-opening system 100 for opening and closing vehicle doors 106 installed on a vehicle door 106. As described above, the vehicle door 106 may include a variety of openings, which may serve other purposes in the vehicle 102. For example, some openings may be a manufacturing artifact of the vehicle door manufacturing operation or may be used to join interior panels to the door frame. In either case, these openings may affix the plate 212 to the vehicle door 106. For example, a first opening 532 may receive the locating hook 424 of the plate 212. As noted above, the first opening 532 may be larger than the locating hook 424 diameter but not so large as to allow translational passage of an arm of the locating hook 424. That is, the plate 212 may be rotated to a parallel position against the vehicle door 106.

The vehicle door 106 may also include a second opening 534 to receive the locking lobe 426. The second opening 534 may be larger than the locking lobe 426. That is, as depicted in FIG. 5B, the locking lobe 426, when the handle 422 is in an unlocked position, may pass to the interior of the vehicle door 106 through the second opening 534. The longitudinal axis of the handle 422 and the locking lobe 426 may be offset from the longitudinal axis of the second opening 534. That is, while the locking lobe 426 may be inserted into the second opening 534, upon rotation of the handle 422, the locking lobe 426 rotates such that a portion of the locking lobe 426 sits behind the vehicle door 106 panel as depicted in FIG. 5C, such that the panel is sandwiched between the locking lobe 426 and the plate 212. That is, as depicted in FIG. 5C, an installer may rotate the handle 422 to move the locking lobe 426 to a locking position behind the vehicle door interior skin.

The vehicle door 106 may further include a third opening 536 to receive the locating protrusion 430. The combination of the locating hook 424, locking lobe 426, and locating protrusion 430 may facilitate the one-handed attachment of the plate 212 to the vehicle door 106. Moreover, the interaction of the locating hook 424, locking lobe 426, and locating protrusion 430 may prevent relative motion of the plate 212 and pin 214 relative to the vehicle door 106 in an x-, y-, and z-direction.

Figure 6A:
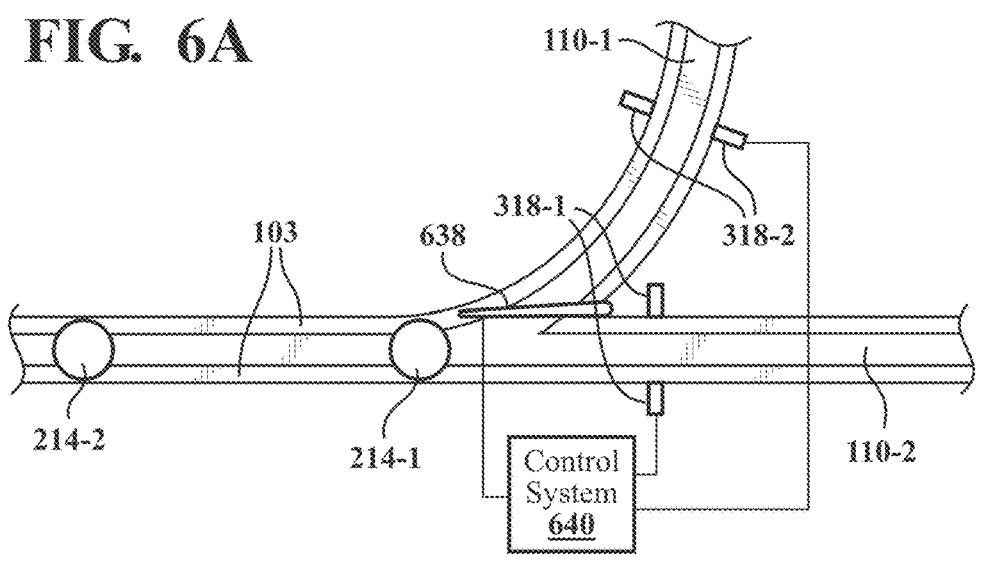
FIGS. 6A-6C illustrate the operation of a diverter of the vehicle door-opening system for opening and closing vehicle doors.
Figure 6B:
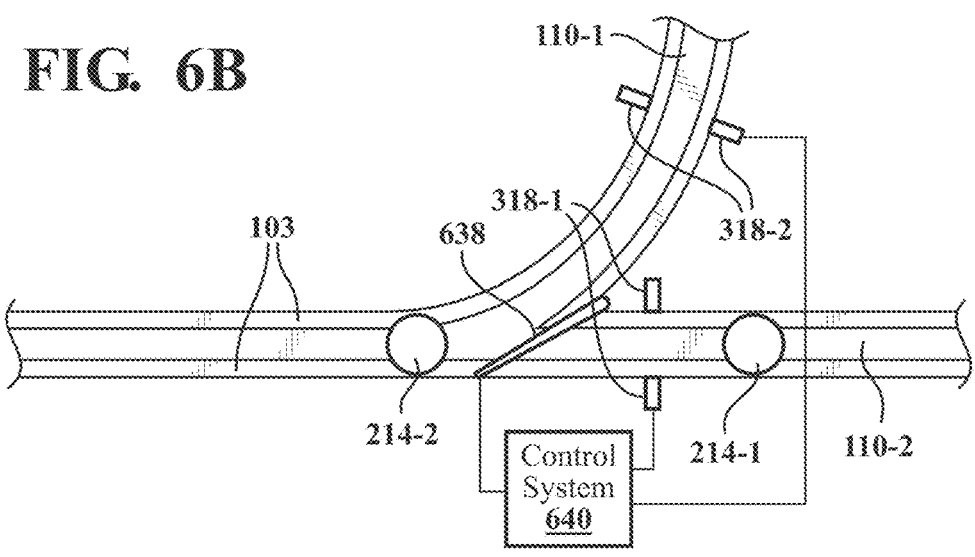
Figure 6C:
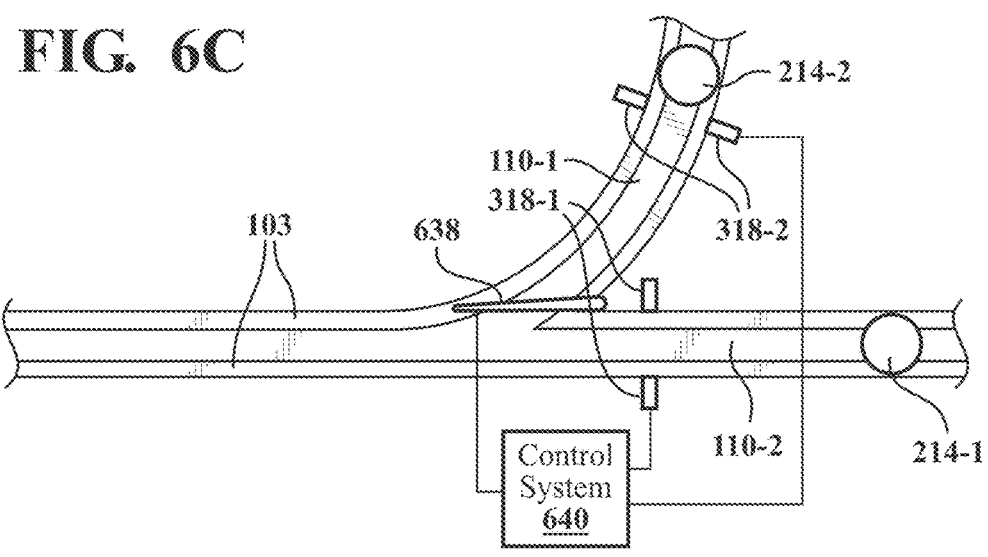

FIGS. 6A-6C illustrate the operation of a diverter 638 of the vehicle door-opening system 100 for opening and closing vehicle doors 106. As described above, the diverter 638 is a switch between the first branched channel 110-1 and the second branched channel 110-2. The diverter 638 alters the path that a pin 214-1 and 214-2 will follow based on the position of the vehicle 102 along the manufacturing line. The position of the vehicle 102 is determined by the monitoring devices 318-1 and 318-2, which detect the movement of the pins 214-1 and 214-2. As such, the vehicle door-opening system 100 includes a control system 640 that receives output from the monitoring devices 318-1 and 318-2 and actuates the diverter 638 to change the diverter position based on such. In an example, the diverter 638 is a pneumatic diverter 638 such that the control system 640 opens an air cylinder to move the diverter 638 between positions. In another example, the diverter 638 is an electromechanical diverter 638 such that the control system 640 passes an electric signal to change the diverter 638 position.

In either case, the control system 640 receives a signal from the first monitoring device 318-1 indicating whether or not a front door pin 214-1 has passed thereby. For example, as depicted in FIG. 6A, as the front door pin 214-1 has not passed into the second branched channel 110-2 as detected by the first monitoring device 318-1, the diverter 638 remains in a position where the front door pin 214-1 is directed towards the second branched channel 110-2.

By comparison, as depicted in FIG. 6B, as the front door pin 214-1 has passed into the second branched channel 110-2, the first monitoring device 318-1 outputs a signal to the control system 640, indicating the passage of the front door pin 214-1. The control system 640 receives this signal and actuates the diverter 638 to switch to a second position. As depicted in FIG. 6B, when in the second position, the diverter 638 guides a pin (e.g., the rear door pin 214-2) towards the first branched channel 110-1, where the interaction between the rear door pin 214-2 and the first branched channel 110-1 causes the rear door to shut as depicted in FIG. 3.

In an example, the detection of the rear door pin 214-2 in the first branched channel 110-1 may trigger a re-set of the diverter 638 from the second position (depicted in FIG. 6B) to the first position (depicted in FIG. 6C), such that a subsequent vehicle in the manufacturing line may be similarly configured (e.g., front doors open while rear doors are closed). As such, as depicted in FIG. 6C, as the rear door pin 214-2 has passed into the first branched channel 110-1, the second monitoring device 318-2 outputs a signal to the control system 640 indicating the passage of the rear door pin 214-2. The control system 640 receives this signal and actuates the diverter 638 to reset to the first position. As depicted in FIG. 6CB, when in the first position, the diverter 638 guides a pin (e.g., the front door pin of a subsequent vehicle 102) towards the first branched channel 110-1.

In an example, the detection of the front door pin 214-1 in the second branched channel 110-2 by the first monitoring device 318-1 and/or the detection of a rear door pin 214-2 in the first branched channel 110-1 by a second monitoring device 318-2, may trigger other actions, such as activation of a manufacturing robot such as a paint robot 320 to begin an activity targeted for execution when one door is open and the other is closed. Such signals may be received by the control system 640, which may be operatively connected to a conveyor encoder or controller of the manufacturing robots and transmitted such that the manufacturing robots execute an intended operation following verification that the vehicle doors 106 are in an intended position.

As described above, the control system 640 may authorize the robots to perform their programmed operations. For example, the control system 640 may pass a signal to a conveyor encoder which authorizes or prevents a manufacturing robot from performing its programmed operation and/or stops the conveyor system when a pin is not detected by the monitoring devices 318 at an expected time, which lack of pin detection may indicate a malfunction or other undesirable scenario.

In an example, the control system 640 may include hardware or a combination of hardware and software. For example, the control system 640 may include one or more processors. In one or more arrangements, the processor(s) can be a primary/centralized processor of the control system or may be representative of many distributed processing units.

The control system 640 can include one or more data stores for storing one or more types of data, such as program instructions that control the diverter 638 based on the signal from the monitoring devices 318-1 and 318-2. The data store is, in one embodiment, an electronic data structure stored in the memory or another data storage device and that is configured with routines that can be executed by the processor for analyzing stored data and controlling a diverter 638. Thus, in one embodiment, the data store stores data used by the control system 640 in executing various functions. The data store can be comprised of volatile and/or non-volatile memory. Examples of memory that may form the data store include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, solid-state drivers (SSDs), and/or other non-transitory electronic storage medium.

The control system 640 generally includes instructions that function to control the processor to receive sensor data from the monitoring devices 318-1 and 318-2. The inputs are, in one embodiment, observations of one or more detected pins 214 along the branched channels 110-1 and 110-2. In one embodiment, the sensor data includes camera images or detections of reflected or transmitted light signals, however, other sensor data indicative of the detected pins 214 may be received.

Furthermore, arrangements described herein may take the form of a computer program product embodied in one or more computer-readable media having computer-readable program code embodied, e.g., stored, thereon. Any combination of one or more computer-readable media may be utilized. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. A non-exhaustive list of the computer-readable storage medium can include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or a combination of the foregoing. In the context of this document, a computer-readable storage medium is, for example, a tangible medium that stores a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages.

Figure 7:
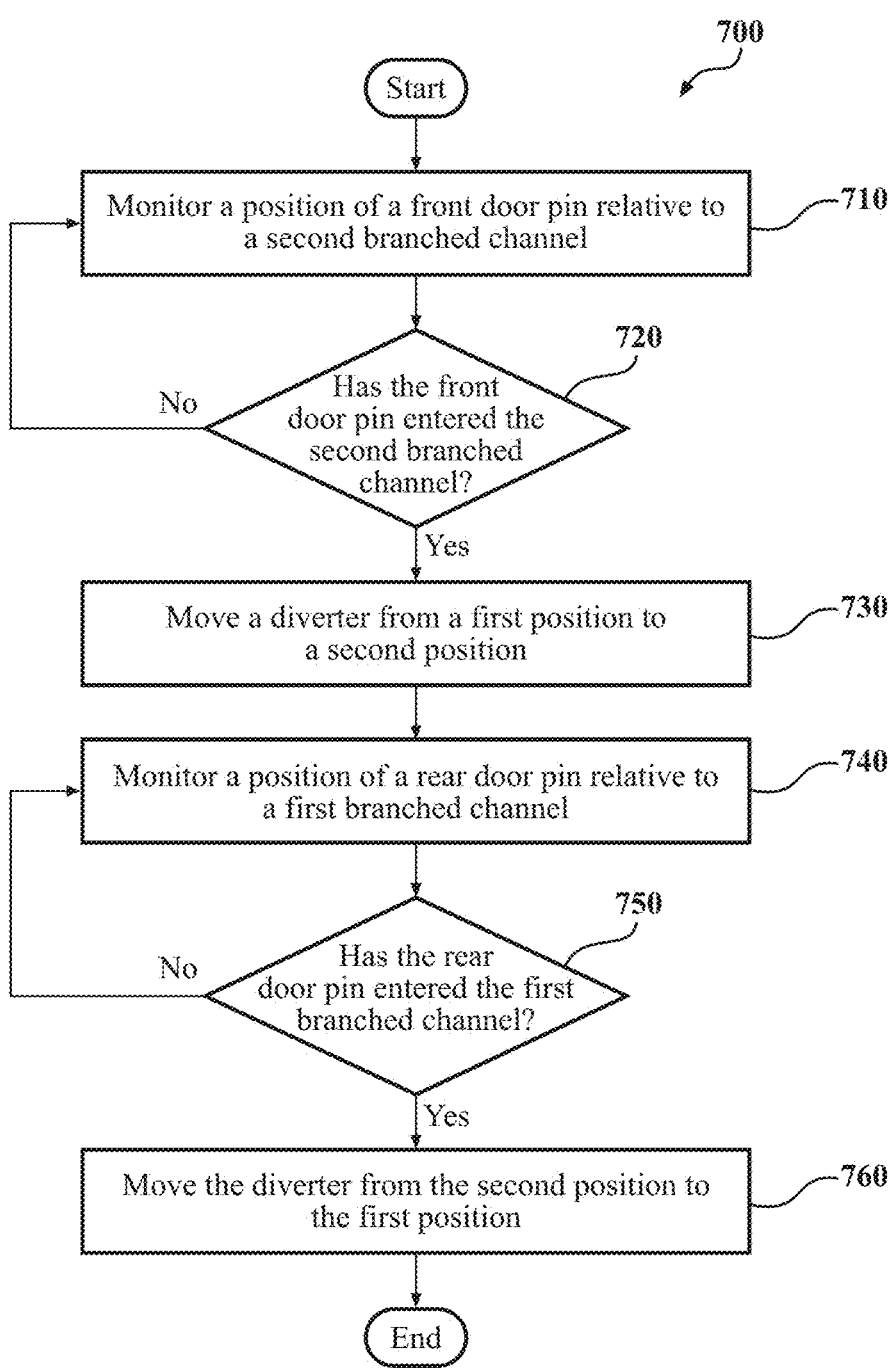
FIG. 7 illustrates a flowchart for one embodiment of a method that is associated with opening and closing vehicle doors.

FIG. 7 illustrates a flowchart for one embodiment of a method 700 that is associated with opening and closing vehicle doors 106. At step 710, the vehicle door-opening system 100 monitors the position of a front door pin 214-1 relative to a second branched channel 110-2. That is, as described above, the first monitoring device 318-1 in whatever form, determines when a front door pin 214-1 affixed to a front vehicle door 106-1 and 106-3 of a vehicle 102 has passed through to the second branched channel 110-2. At 720, if the front door pin 214-1 has not passed to the second branched channel 110-2, i.e., the vehicle 102 is in the first region 316-1 of the manufacturing line, no diverter 638 re-direction is taken, and the first monitoring device 318-1 continues to monitor the position of the front door pin 214-1 relative to the second branched channel 110-2.

At 720, if the front door pin 214-1 has entered the second branched channel 110-2, at 730 the control system 640 moves the diverter 638 from a first position where a pin is guided to the second branched channel 110-2 to a second position where a pin is guided to a first branched channel 110-1. This output signal may also be transmitted to a conveyor encoder or other manufacturing robot controller to authorize the manufacturing robot to carry out an operation consistent with its programming. That is, the output signal may be a check for the robot controller to ensure the safe and intended operation of the manufacturing robot.

At 740, the second monitoring device 318-2 may monitor the position of a rear door pin 214-2 relative to a first branched channel 110-1. That is, after the rear door of a first vehicle 102-1 has been closed, it may be desirable to re-set the diverter 638 to a position where a front vehicle door 106-1 and 106-3 of the second vehicle 102-2 is directed to the second branched channel 110-2. If this is not performed and the diverter 638 remains in a second position, the front door of the second vehicle 102-2 may be closed, rather than maintained opened as intended and as done for the first vehicle 102-1.

At 750, if the rear door pin 214-2 has not passed to the first branched channel 110-1, no diverter 638 re-direction is taken, and the second monitoring device 318-2 continues to monitor the position of the rear door pin 214-2 relative to the first branched channel 110-1.

At 750, if the rear door pin 214-2 has entered the first branched channel 110-1, at 760 the control system 640 moves the diverter 638 from the second position where a pin is guided to the first branched channel 110-1 to a first position where a pin is guided to a second branched channel 110-2. As such, the control system 640 re-sets the diverter to facilitate again the opening and closing of the front and rear doors at different longitudinal positions along the manufacturing line.

In executing the method, the control system 640 controls the monitoring devices 318-1 and 318-2 to acquire the sensor data. Moreover, in further embodiments, the control system 640 controls the monitoring devices 318-1 and 318-2 to acquire the sensor data at successive iterations or time steps. Thus, the control system 640, in one embodiment, iteratively executes the functions discussed at blocks 710-760 to acquire the sensor data and provide information therefrom.

Figure 8A:
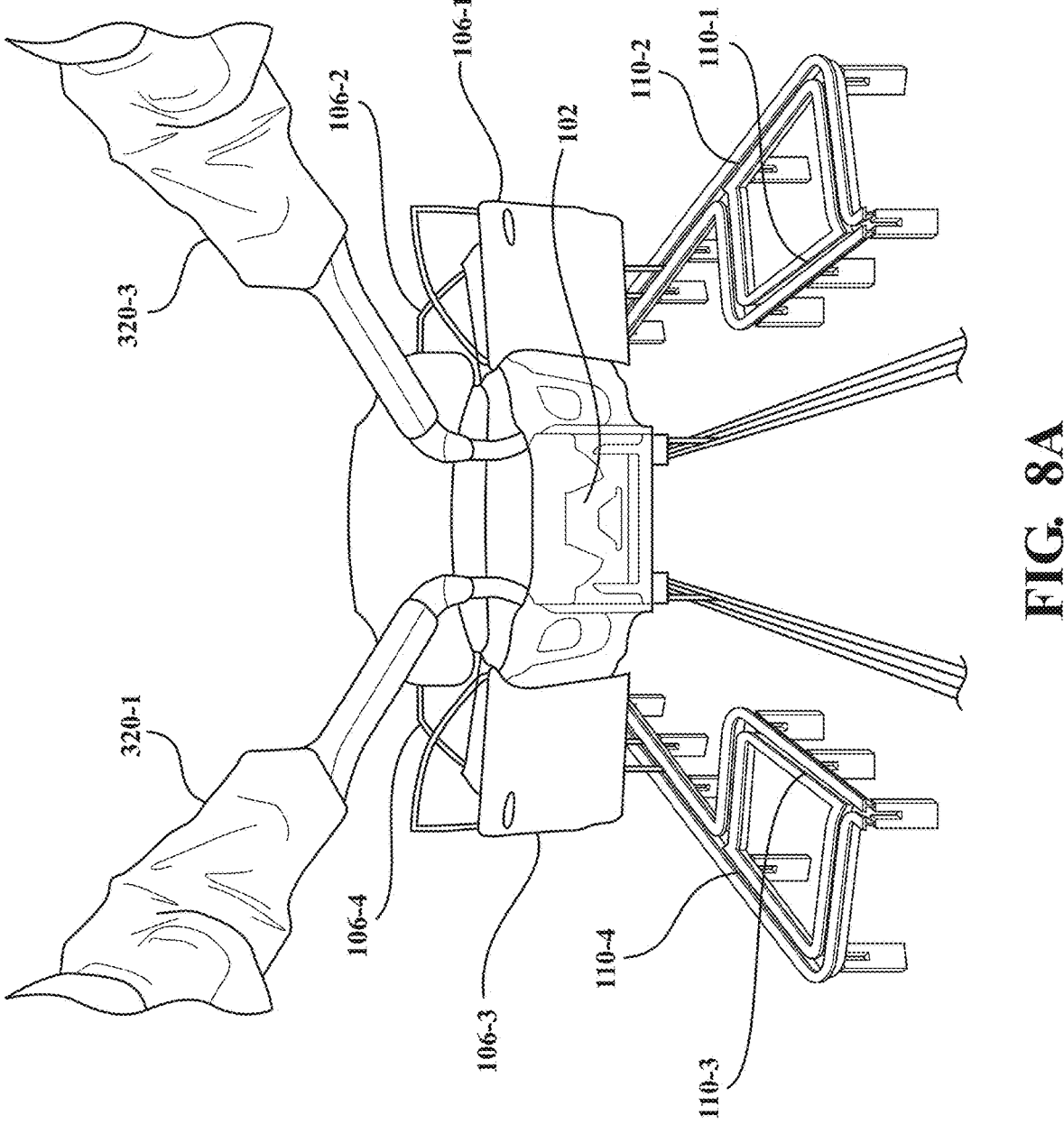
FIGS. 8A-8C illustrate a front view of a vehicle door-opening system opening and closing vehicle doors.
Figure 8B:
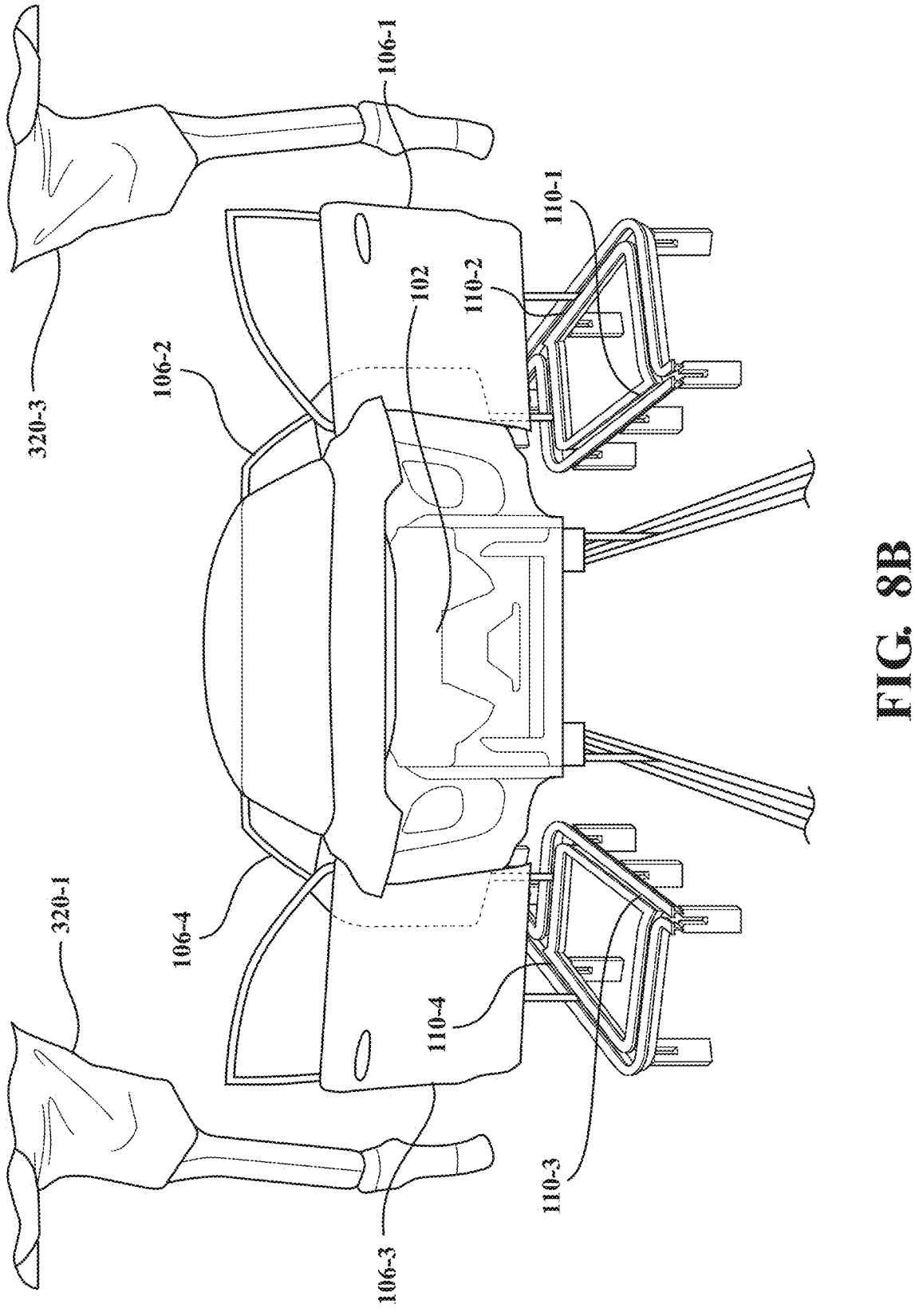
Figure 8C:
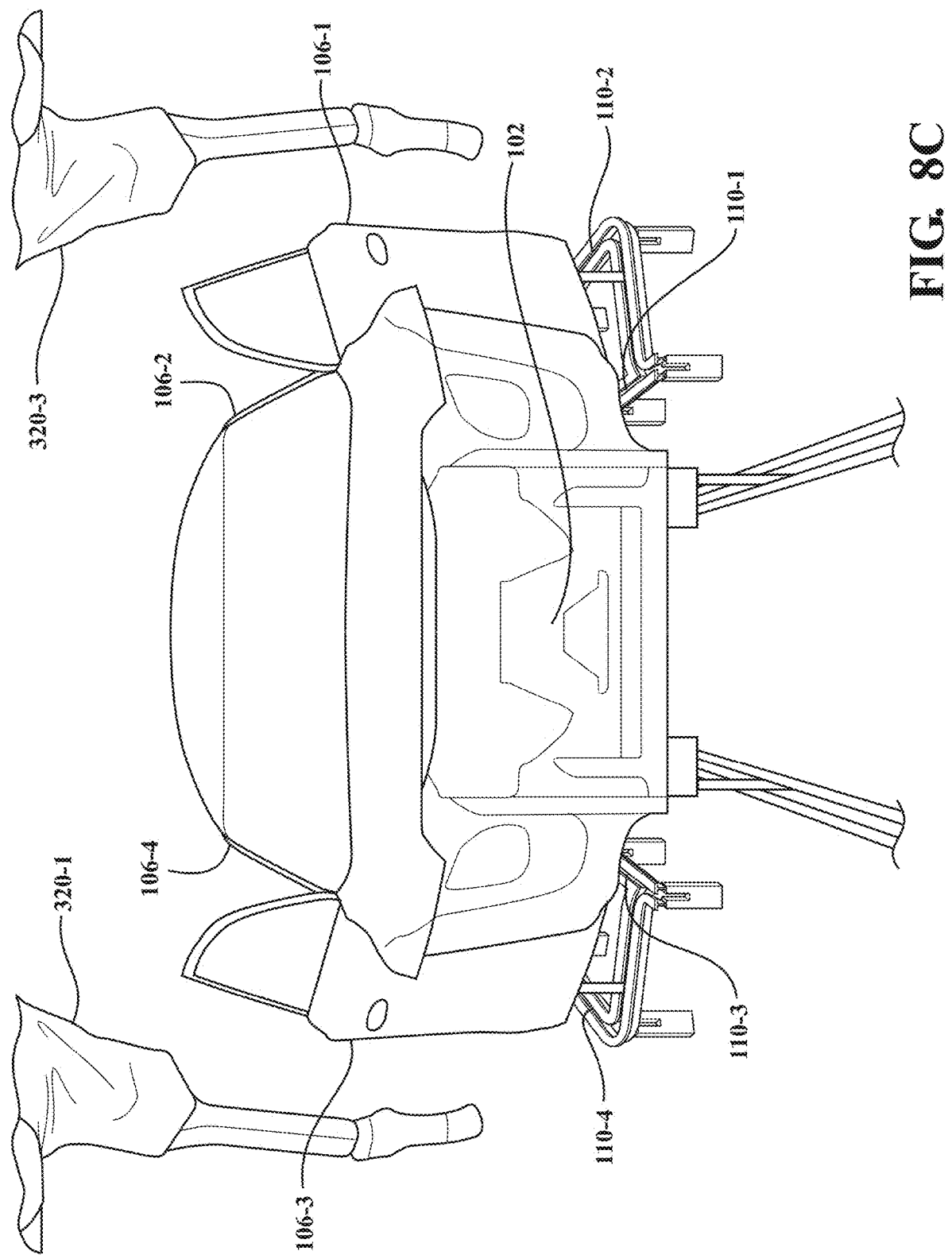

FIGS. 8A-8C illustrate one embodiment of a vehicle door-opening system 100 opening and closing vehicle doors 106-1, 106-2, 106-3, and 106-4. FIG. 8A depicts the vehicle 102 in a first region 316-1 where all vehicle doors 106-1, 106-2, 106-3, and 106-4 are opened via interaction of the respective door pins 214 and the set of channels 110. As depicted in FIG. 8A, the vehicle 102 has not yet reached the junction between the branched channels 110.

FIG. 8B depicts the vehicle 102 in a second region 316-2 where the front vehicle doors 106-1 and 106-2 are opened while the rear doors 106-3 and 106-4 have been closed. As described above, this is because the front door pins 214-1 are within the second branched channels 110-2 and 110-4, while the rear door pins 214-2 are within the first branched channels 110-1 and 110-3.

FIG. 8C depicts the vehicle 102 in a third region 316-3, where all vehicle doors 106-1, 106-2, 106-3, and 106-4 have been closed via interaction of the respective door pins 214 and the set of channels 110.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-8C, but the embodiments are not limited to the illustrated structure or application.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A vehicle door-opening system, comprising:
a plate attachable to a vehicle door;
a pin inserted into a pin sleeve of the plate, the pin extends downward from the vehicle door; and
a set of channels on lateral sides of the vehicle, the set of channels extend in a direction of travel of the vehicle along a manufacturing line, wherein each channel receives and guides the pin as the vehicle travels along the manufacturing line, and wherein, as the vehicle travels along the manufacturing line, interaction between the pin and the channel opens and closes the vehicle door.

2. The vehicle door-opening system of claim 1, wherein the set of channels comprises:
a first branched channel to close a rear door of the vehicle at a first longitudinal position along the manufacturing line; and
a second branched channel to close a front door of the vehicle at a second longitudinal position along the manufacturing line.

3. The vehicle door-opening system of claim 1, wherein the plate is attached to the vehicle door below a region of the vehicle that is to receive paint.

4. The vehicle door-opening system of claim 1, wherein the plate is removably attached to the vehicle door.

5. The vehicle door-opening system of claim 1, wherein the pin slides vertically within the channel.

6. A vehicle door-opening system, comprising:
a plate attachable to a vehicle door;
a pin inserted into a pin sleeve of the plate, the pin extends downward from the vehicle door;
a set of channels on lateral sides of the vehicle, the set of channels extend in a direction of travel of the vehicle along a manufacturing line, a channel receives and guides the pin as the vehicle moves along the manufacturing line, as the vehicle moves an interaction between the pin and a curve in the channel opens and closes the vehicle door; and
a diverter to:
when in a first position, guide a front door pin to the second branched channel, wherein the front door is maintained open along the second branched channel at the first longitudinal position along the manufacturing line; and
when in a second position, guide a rear door pin to the first branched channel, wherein the rear door is closed along the first branched channel at the first longitudinal position along the manufacturing line.

7. The vehicle door-opening system of claim 6, further comprising a control system to:
monitor entry of the front door pin to the second branched channel; and
trigger movement of the diverter from the first position to the second position responsive to the front door pin entering the second branched channel.

8. The vehicle door-opening system of claim 7, wherein the control system:
monitors entry of the rear door pin to the first branched channel; and
triggers actuation of a manufacturing robot responsive to the rear door pin entering the first branched channel.

9. The vehicle door-opening system of claim 8, wherein the manufacturing robot is a painting robot that applies paint to the vehicle.

10. A vehicle door-opening system, comprising:
a plate attachable to a vehicle door;
a pin inserted into a pin sleeve of the plate, the pin extends downward from the vehicle door; and
a set of channels on lateral sides of the vehicle, the set of channels extend in a direction of travel of the vehicle along a manufacturing line, a channel receives and guides the pin as the vehicle moves along the manufacturing line, wherein:
the channel curves laterally away from the vehicle, as the vehicle moves an interaction between the pin and the channel opens the vehicle door; and the channel curves laterally toward the vehicle, as the vehicle moves the interaction between the pin and the channel closes the vehicle door.

11. The vehicle door-opening system of claim 10, wherein the set of channels includes:

a first branched channel to close a rear door of the vehicle at a first longitudinal position along the manufacturing line; and a second branched channel to close a front door of the vehicle at a second longitudinal position along the manufacturing line.

12. The vehicle door-opening system of claim 11, further comprising a diverter to:

when in a first position, guide a front door pin to the second branched channel, wherein the front door is maintained open along the second branched channel at the first longitudinal position along the manufacturing line; and when in a second position, guide a rear door pin to the first branched channel, wherein the rear door is closed along the first branched channel at the first longitudinal position along the manufacturing line.

13. The vehicle door-opening system of claim 12, further comprising a control system to:

monitor entry of the front door pin to the second branched channel; and trigger movement of the diverter from the first position to the second position responsive to the front door pin entering the second branched channel.

14. The vehicle door-opening system of claim 13, wherein the control system:

monitors entry of the rear door pin to the first branched channel; and triggers actuation of a painting robot responsive to the rear door pin entering the first branched channel.

15. The vehicle door-opening system of claim 10, wherein the plate is attached to the vehicle door below a region of the vehicle that is to receive paint.

16. The vehicle door-opening system of claim 10, wherein the pin slides vertically within the channel.

17. A vehicle door-opening system, comprising:

a plate attachable to a vehicle door;

a pin inserted into a pin sleeve of the plate, the pin extends downward from the vehicle door;

a set of channels on lateral sides of the vehicle, the set of channels extend in a direction of travel of the vehicle along a manufacturing line, a channel receives and guides the pin as the vehicle moves along the manufacturing line, wherein the set of channels comprises:

a first branched channel to close a rear door of the vehicle at a first longitudinal position along the manufacturing line; and a second branched channel to close a front door of the vehicle at a second longitudinal position along the manufacturing line; and a diverter to selectively direct a front door pin to the second branched channel and a rear door pin to the first branched channel.

18. The vehicle door-opening system of claim 17, further comprising a control system to:

monitor entry of the front door pin to the second branched channel; and trigger movement of the diverter from a first position to a second position responsive to the front door pin entering the second branched channel.

19. The vehicle door-opening system of claim 18, wherein the control system:

monitors entry of the rear door pin to the first branched channel; and triggers actuation of a painting robot responsive to the rear door pin entering the first branched channel.

20. The vehicle door-opening system of claim 17, wherein the plate is attached to the vehicle door below a region of the vehicle that is to receive paint.

\*  \*  \*  \*  \*